US012574415B1

(12) United States Patent
Allen

(10) Patent No.: US 12,574,415 B1
(45) Date of Patent: Mar. 10, 2026

(54) VERIFICATION CHECKER FOR A CMP

(71) Applicant: Quantcast Corporation, San Francisco, CA (US)

(72) Inventor: Andrew Allen, Hammond Ranch, CA (US)

(73) Assignee: Quantcast Corporation, San Francisco, CA (US)

( * ) Notice: Subject to any disclaimer, the term of this patent is extended or adjusted under 35 U.S.C. 154(b) by 314 days.

(21) Appl. No.: 17/963,668

(22) Filed: Oct. 11, 2022

Related U.S. Application Data

(60) Provisional application No. 63/254,668, filed on Oct. 12, 2021.

(51) Int. Cl.
H04L 29/00 (2006.01)
H04L 9/40 (2022.01)

(52) U.S. Cl.
CPC .......... H04L 63/20 (2013.01); H04L 63/0876 (2013.01); H04L 63/30 (2013.01)

(58) Field of Classification Search
CPC ...... H04L 63/20; H04L 63/0876; H04L 63/30
USPC ............................................. 726/1
See application file for complete search history.

(56) References Cited

U.S. PATENT DOCUMENTS 11,102,094 B2 * 8/2021 Kieviet ............... G06F 11/3466
2018/0343174 A1 * 11/2018 Battre .................... H04L 67/02

* cited by examiner

*Primary Examiner* — Brandon Hoffman
*Assistant Examiner* — Michael D Anderson
(74) *Attorney, Agent, or Firm* — Andrea Wheeler

(57) ABSTRACT

A consent verification checker is an application operating on an operator device that verifies that a consent tag for a consent management platform has been properly installed by a webpage operator and that the consent management platform is operating and is configured correctly. The consent verification checker executes on the operator device and detects issues with the installation of the consent tag and the operation of the CMP based on webpage execution data describing the execution of instructions for displaying the webpage. When using the consent verification checker, a webpage operator can determine whether they have correctly installed a consent tag on their webpage, and that their CMP is operating and configured correctly, by easily loading and displaying their webpage on their own client device, without significant web page technical debugging and diagnostic skills.

18 Claims, 5 Drawing Sheets

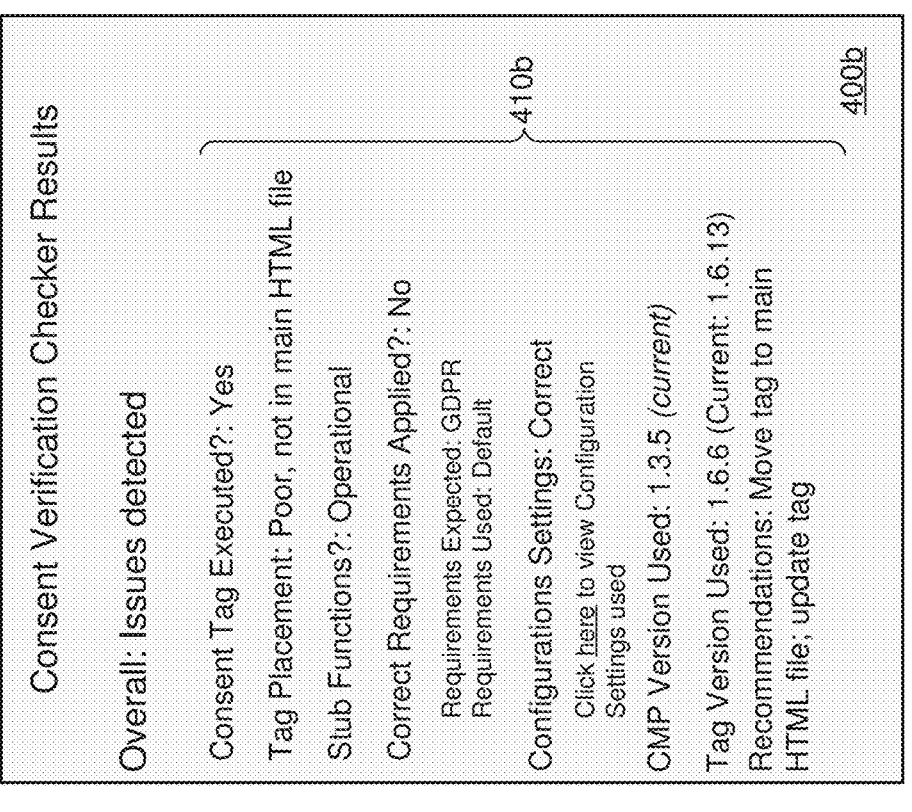

Consent Verification Checker Results

Overall: Issues detected

Consent Tag Executed?: Yes

Tag Placement: Poor, not in main HTML file

Stub Functions?: Operational

Correct Requirements Applied?: No

Requirements Expected: GDPR
Requirements Used: Default

Configurations Settings: Correct

Click here to view Configuration
Settings used

CMP Version Used: 1.3.5 (current)

Tag Version Used: 1.6.6 (Current: 1.6.13)
Recommendations: Move tag to main
HTML file, update tag 410b 400b

FIG. 4B

Consent Verification Checker Results

Overall: Great! No issues detected

Consent Tag Executed?: Yes

Tag Placement: Good

Stub Functions?: Operational

Correct Requirements Applied?: Yes

Requirements Expected: GDPR
Requirements Used: GDPR

Configurations Settings: Correct

Click here to view Configuration
Settings used

CMP Version Used: 1.3.5 (current)

Tag Version Used: 1.6.13 (current)

Receive Webpage Files
500

Execute Instructions for Webpage Files
510

Generate Verification Results
520

Display Verification Results
530

VERIFICATION CHECKER FOR A CMP

CROSS-REFERENCE TO RELATED APPLICATION

This application claims the benefit of U.S. Provisional Patent Application No. 63/254,668, entitled "Consent Management Validation System," filed on Oct. 12, 2021, which is incorporated by reference.

BACKGROUND

Websites commonly collect and process data describing a user's behavior or interests to improve their functionality or to provide a better experience to the user. However, many jurisdictions are considering or have passed legislation limiting the ability of websites to collect and process personal data without user consent. Two major, recent examples are the General Data Protection Regulation in Europe and the California Privacy Rights Act in California. These privacy regimes are new, complicated, and not always consistent with each other, which makes it difficult for website operators to ensure that they are complying with whichever laws and regulations are applicable when they serve webpages to users.

Some webpage operators use consent management platforms (or "CMPs") to ensure that they receive any required user consent and/or acknowledgement, and/or to record any required notice that has been given to the user regarding data collection or processing, before the operators collect or process user data. A CMP obtains and maintains all necessary user consent for the collection and processing of the user's data. These CMPs are generally offered by third parties to webpage operators so the operators can ensure that they are complying with user consent laws and regulations.

Some CMPs may use a consent tag, which is a bootstrapping component that initializes some setup processes to prepare for the execution of the full CMP. The consent tag is a relatively simple approach for installing a CMP into a webpage because it is a smaller and less complex program to install than the CMP. Additionally, the consent tag may automate some installation steps that a webpage operator may otherwise have to perform.

However, some webpage operators may still make errors in installing the consent tag. Improperly installed consent tags may cause other website components to execute improperly, which may limit the functionality of the other website components and/or put the website web page operator at risk of violating data privacy laws or regulations. For example, the consent tag may be installed in a location within webpage files for the webpage that will cause the consent tag to be executed too late, meaning that the consent tag executes after components of the webpage that require the CMP to execute. These other webpage components may thereby execute before the CMP executes, which can limit or break the functionality of these components, or cause the components to incorrectly assume that no CMP is installed. The likelihood that the consent tag is improperly installed is particularly high for website operators who are not experienced web page developers. For example, a small business owner who is not an experienced web page developer may use a pre-configured template to produce their web page. Because the consent tag is relatively easy to install, the small business owner may be capable of installing the consent tag. However, they may not be experienced enough with technical aspects of web page operation to verify that it is installed or operating correctly in the web page. The likelihood that the consent tag is improperly installed is also particularly high for website operators with many pages in their website (or "domain"). Because the consent tag is relatively easy to install, the operator of a website with many pages may be able to install the consent tag on every page. However, they may not have time or resources to verify the installation and operation of the tag on every page. Thus, even while using a CMP with a consent tag, webpage operators may still be at risk of limiting the functionality of the website components and/or violating data privacy laws and regulations.

SUMMARY

A consent verification checker is an application installed on an operator device that verifies that a consent tag for a consent management platform ("CMP") has been properly installed by a webpage operator, and that the CMP, when installed, is operating correctly. The consent verification checker executes on the operator device and detects issues with the installation of the consent tag and/or operation of the CMP, based on collecting webpage execution data describing the execution of instructions for displaying the webpage. Thus, when using the consent verification checker, a webpage operator can determine whether they have correctly installed a consent tag in their webpage, identify potential issues with their installation of the consent tag in their webpage, and/or check that the CMP operates correctly, by simply loading and displaying their webpage on their own client device.

To check the installation of the consent tag, the operator device receives webpage files from a web server system for a webpage operated by the operator. These webpage files include the instructions for displaying the webpage on the operator device. For example, the webpage files may include the main HTML file to which the URL for the webpage is directed and any scripts and/or sub-resources (e.g., stylesheets or embedded images) used by the webpage. The operator device renders the HTML by executing the instructions of the webpage files to display the webpage to the operator.

The consent verification checker intercepts and records webpage execution data describing the execution of the webpage files (e.g., function call logs describing which functions were called, and network request logs describing which network requests were made). The consent verification checker uses this webpage execution data to verify that the consent tag was properly installed by the operator. For example, the consent verification checker may apply verification rules to the webpage execution data to generate verification results that indicate whether the consent verification checker detected any issues with the installation of the consent tag or operation of the CMP. These verification results may, for example, indicate whether the consent tag was installed too late in the webpage files, whether the consent tag properly defined stub functions used by the CMP, or whether the CMP applied appropriate consent requirements based on the geographic location of the operator device. The verification results may also include details of the configuration of the CMP and version numbers. The consent verification checker displays these verification results to the operator so the operator can ensure that they installed the consent tag properly before the webpage is served to users, confirm that the CMP is operating correctly and in accordance with configuration settings from the operator, and/or determine any mistakes they have made installing the consent tag in their webpage.

Advantageously, by generating and displaying the verification results to the operator, the consent verification checker allows a webpage operator to ensure that they are complying with user privacy and consent laws and regulations by having a correctly installed and operating CMP. Thus, a webpage operator can be confident that they installed the consent tag such that the full CMP operates correctly as part of their webpage.

Advantageously, by operating the consent verification checker on the operator's own client device, the operator can test the CMP operating on their webpage on a device that is similar to the one their users will use to view their webpage, but without the risk that the webpage would improperly collect or process user data during testing.

Advantageously, because the consent verification checker is easily installed and operated on the operator device, a webpage operator that is not experienced with technical aspects of web page operation including diagnosing and solving possible issues with the consent tag and CMP can confirm that the consent tag is properly installed in their webpage and that the CMP is operating properly.

Advantageously, because the consent verification checker identifies issues with the installation of the consent tag and CMP, and provides guidance to correct errors, a webpage operator that is not experienced with technical aspects of web page operation including diagnosing and solving technical issues in their webpage, can identify and correct errors and properly install the consent tag in their webpage.

Advantageously, because the consent verification checker is easily installed and operated on the operator device, a webpage operator that that has many webpage in their site (or "domain") may be able to quickly and easily confirm that the consent tag is properly installed in their web pages, confirm that the CMP is operating properly, and identify and correct errors to properly install the consent tag in their webpage.

Advantageously, the consent verification checker improves the accessibility and usefulness of CMPs for web page operators, decreases the likelihood that web page operators are violating data privacy laws and regulations, and increases the likelihood that web page components are fully functional and will be able to use the functions of the CMP as intended.

BRIEF DESCRIPTION OF THE DRAWINGS

Figure (FIG. 1 illustrates an example system environment for a consent verification checker, in accordance with some embodiments.

FIGS. 4A and 4B illustrate example user interfaces displaying different verification results generated by a consent verification checker, in accordance with some embodiments.

DETAILED DESCRIPTION

Figure 1:
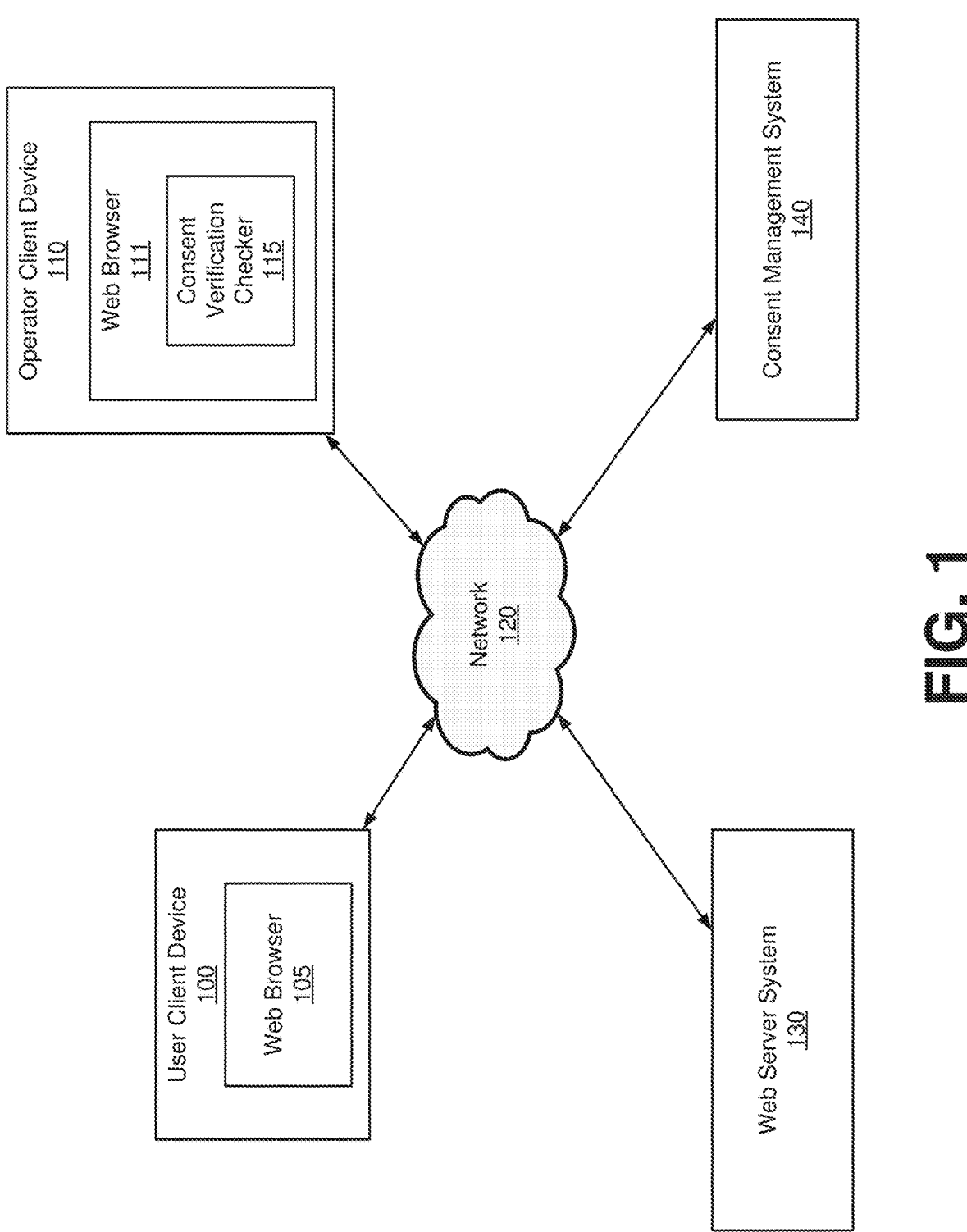

Figure (FIG. 1 illustrates an example system environment for a consent verification checker, in accordance with some embodiments. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user device 100 is a personal computing device (e.g., a smartphone, a tablet, a laptop computer, or desktop computer) that is operated by a user. A user may be a person who uses user device 100 to access web pages on the internet. The user device 100 executes a web browser 101 that receives web page files 102 from the web server system 130 and displays them to the user through a user interface. To display the webpage to the user, web browser 101 receives a set of webpage files 102 from the web server system 130 and sequentially executes the instructions in those webpage files to display the webpage. The webpage files include a main HTML file that corresponds to a uniform resource locator (URL) for the webpage. This HTML file may reference other files for execution by the user device 100 for displaying the webpage. For example, the HTML file may call certain scripts from the web server system 130 to be executed to display the webpage. The webpage files may also include scripts that are executed as components of the webpage while the webpage is displayed to the user and while the user interacts with the webpage.

The webpage files may include a consent management platform ("CMP") 103 for the webpage. A CMP 103 manages and enforces the user's consent to the collection and processing of the user's personal data (e.g., data that describes the user or the user's actions, or that can be used to identify the user, or that is associated with the user or the user device 100). The CMP 103 may determine which consent requirements apply to the user for determining what user data, if any, can be collected and processed. The CMP 103 may use one or more criteria to determine which consent requirements to apply. For example, the CMP 103 may use the user device 100 IP address to determine whether a local jurisdiction in which the user device is located requires more strict consent requirements to be applied to the user's data. Similarly, the CMP 103 may estimate a user's age and apply more strict consent requirements if the user is younger than if the user is older. The CMP 103 restricts the collection and processing of the user's data where the user has not provided required consent or acknowledgment, or received the proper notice, for the collection and processing of their data. The CMP 103 also prompts the user to consent to or acknowledge the collection and processing of their data if necessary to execute components of the webpage. If the user provides the necessary consent or acknowledgment, or receives the proper notice, the CMP 103 instructs these components that the user's data may be collected or processed. If the user does not provide the necessary consent or acknowledgment, or receive the proper notice, the CMP 103 instructs these components to operate without collecting or processing user data, or to not operate at all. In some cases, consent and/or acknowledgment and/or notice is not required; in those cases the CMP 103 instructs these components that the user's data may be collected or processed.

In some embodiments, the CMP 103 uses a consent string for managing a user's consent. A consent string is a series of values that indicate uses for which the user has consented to the collection and processing of their data. The CMP 103 may use the consent string to automatically approve or deny requests by components of the webpage to collect or process user data. Additionally, if the consent string indicates that the user has not indicated one way or the other on whether they consent to the collection or processing of their data for a purpose, the CMP 103 may prompt the user to accept, acknowledge, or deny the collection or processing of their data for that purpose, or may provide notice of the collection or processing of their data for that purpose. The CMP 103 may update the consent string according to the user's response to that prompt.

The CMP 103 may be bootstrapped by a consent tag 104. The consent tag 114 is a script (e.g., JavaScript code) that is added by the webpage operator to the webpage files 102. The consent tag 104 executes when the webpage files 102 execute and starts the loading and execution of the CMP 103. When using consent tag 104, CMP 103 is loaded and executed by the browser as a component of web page files 102. In some embodiments, the consent tag 104 loads the CMP 103 from the consent management system web server 140. The consent tag 104 may also perform setup processes to prepare the user device 100 for executing the CMP 103. For example, the consent tag 104 may establish stub functions that are used by the CMP 103 to verify user consent. These stub functions may include a "_tcfapi" function and/or a "_uspapi" function as defined in the IAB TCF and USP API standards.

The operator device 110 is a personal or mobile computing device (e.g., a smartphone, a tablet, a laptop computer, or desktop computer) that is operated by an operator of a webpage. A webpage operator, as used herein, is the person or entity that controls the content of the webpage. The operator may own and operate the web server system 130 or may use the web server system 130 as a host for their webpage. As described with reference to the user device 100 above, the operator device 110 executes a web browser 111 that receives and executes webpage files 112 from the web server system 130 and displays them to the operator through a user interface. The operator device 110 may use similar processes to display the webpage as the user device 100 as described above. The webpage files 112 in the web browser 111 on the operator device 111 include a consent management platform ("CMP") 113 and a consent tag 114. The consent tag 114 is installed in the web page files 112 by the web page operator. The CMP 113 and consent tag 114 execute as described with reference to user device 100 above. The operator device 110 may use similar processes to load and execute CMP 113 using consent tag 114 when loading web page files 112 as the user device 100 as described above.

The web browser 111 includes a consent verification checker 115. The consent verification checker 115 is an application that verifies that the consent tag 114 has been correctly installed as a component of the webpage by the operator and that CMP 113 operates correctly. The consent verification checker 115 can be easily found, downloaded, and installed on the web browser 111 by the web page operator via a direct web link URL provided by the consent management system 140, via a web page that publishes publically-available third-party web browser extensions, or via a search engine. In the embodiment illustrated in FIG. 1, the consent verification checker 115 operates as part of the web browser 111. For example, the consent verification checker 115 may be a component of the web browser 111 or may be web browser extension or plugin (e.g., provided by the consent management system 140). However, the consent verification checker 115 alternatively may operate as an independent application executing on the operator device 110. Advantageously, even a webpage operator who is not experienced with technical aspects of web page operation, including diagnosing and solving technical issues in their webpage, can easily install the consent verification checker 115 as a web browser extension or plugin or as application downloaded on the operator device 110. The consent verification checker 115 is described in more detail with regards to FIG. 2.

While the consent verification checker 115 is primarily described herein as being installed on an operator device, in alternative embodiments, the consent verification checker 115 may be installed on a client device operated by a third-party entity. For example, the consent verification checker 115 may be installed on a client device 110 operated by a data protection authority, to review a consent tag 114 installed on a webpage by the web page operator for the data protection authority to confirm compliance with regulations. In another example, the client device may be operated by a provider of a consent management system 140 for the consent management system 140 to provide help to an operator of a webpage in installing consent tag 114 in a web page by the web page operator, and for the consent management system 140 to evaluate the correct installation and operation of a consent tag 114 and the CMP 113. In these embodiments, operator device 110 and consent verification checker 115 operate as described herein.

The user device 100, the operator device 110, the web server system 130, and the consent management system 140 are connected to the network 120. The network 120 is a collection of computing devices that communicate via wired or wireless connections. The network 120 may include one or more local area networks (LANs) or one or more wide area networks (WANs). The network 120, as referred to herein, is an inclusive term that may refer to any or all of standard layers used to describe a physical or virtual network, such as the physical layer, the data link layer, the network layer, the transport layer, the session layer, the presentation layer, and the application layer. The network 120 may include physical media for communicating data from one computing device to another computing device, such as MPLS lines, fiber optic cables, cellular connections (e.g., 3G, 4G, or 5G spectra), or satellites. The network 120 also may use networking protocols, such as TCP/IP, HTTP, SSH, SMS, or FTP, to transmit data between computing devices. In some embodiments, the network 120 may include Bluetooth or near-field communication (NFC) technologies or protocols for local communications between computing devices. The network 120 may transmit encrypted or unencrypted data.

The web server system 130 receives requests for webpages from client devices (e.g., the user device 100 and the operator device 110) and transmits the webpages to the client devices for display. The web server system 130 may be a single computing device or multiple computing devices that work together to serve webpages. The web server system 130 may be operated by the operator corresponding to the operator device 110 or may be operate as a host for third-party websites operated by others. The web server system 130 stores and serves webpage files needed to display webpages. The web server system 130 stores and serves webpage files 102, 112 containing consent tag 104, 114 installed in the web page files 102, 112 by the operator of the web pages. For example, the web server system 130 stores and serves the HTML files for webpages, any style sheet files (e.g., CSS) for the webpages, and any script programs (e.g., JavaScript) that may be components of the webpage.

The consent management system 140 provides the CMP 103, 113 to webpage operators so that the operators ensure that they have received any required user consent for collecting or processing any user data. The consent management system 140 provides the consent tag 104, 114 to web page operators for those operators to include in the webpage files 102, 112. Additionally, the consent management system 140 stores the CMP 103, 113 to serve to client devices when the consent management system 140 receives the request for the CMP 103, 113 from a client device that has executed the consent tag 104, 114. The CMP 103, 113 may perform all consent management operations locally on the client device. Alternatively, the CMP 103, 113 may transmit user consent information (e.g., the user's consent string) to the consent management system 140 and the consent management system 140 transmits instructions to the CMP 103, 113 on what user data, if any, can be collected or processed by the webpage. In some embodiments, the consent management system 140 provides the consent verification checker 115 to the operator device 110 for execution on the operator device 110. In other embodiments, a different system (e.g., a third-party consent management verification provider) provides the consent verification checker 115 to the operator device 110 for execution on the operator device 110.

Figure 2:
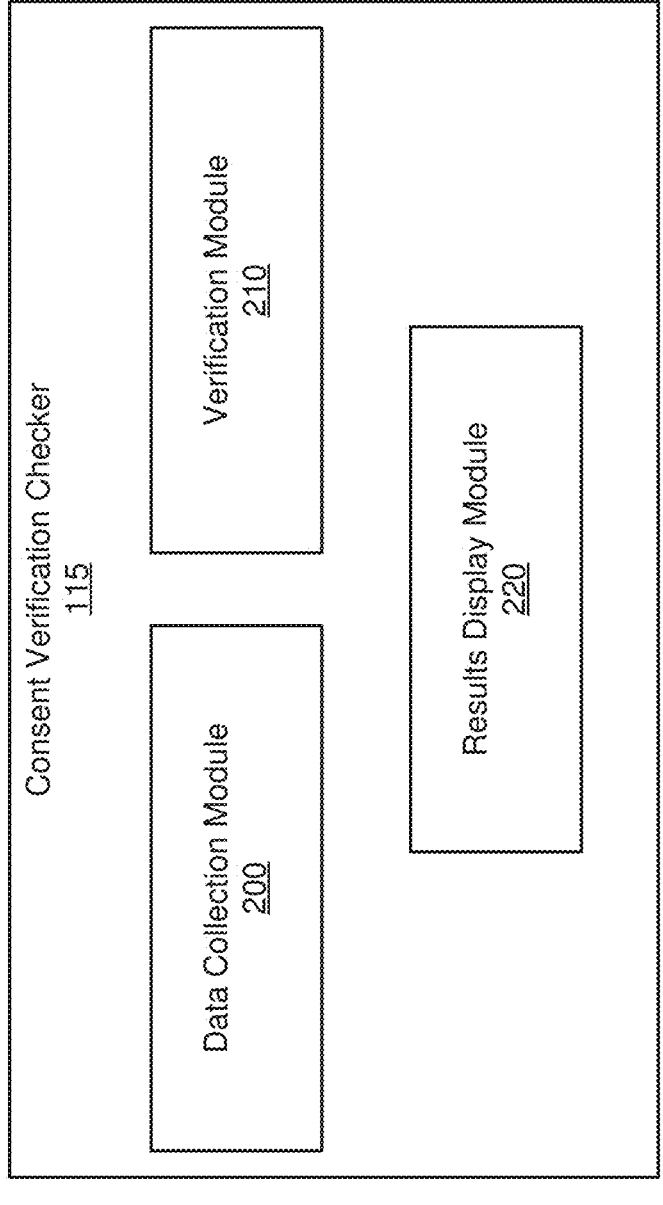
FIG. 2 illustrates an example system architecture of a consent verification checker 115, in accordance with some embodiments.

FIG. 2 illustrates an example system architecture of a consent verification checker 115, in accordance with some embodiments. Alternative embodiments of the consent verification checker 115 may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 receives, from the operator device 110, webpage execution data that is produced when the web browser 101, 111 executes the webpage files 112. The webpage execution data is used by the consent verification checker 115 to verify that the consent tag 114 has been correctly installed. Webpage execution data is data describing the operator device 100 execution of the webpage files 112 to display the webpage. The webpage execution data may include log data describing actions taken by the operator device 110 in displaying the webpage. For example, the webpage execution data may include function call logs, network request logs, and resource utilization logs, and the results of calling functions and inspecting the configuration of the CMP 113. The webpage execution data may include data collected while the webpage files were executed to display the webpage to the user and data collected while the webpage is displayed to the user. The webpage execution data also may include data describing the execution of the consent tag 114 and the CMP 113. For example, the webpage execution data may describe when certain functions for the CMP 113 were defined and called, the parameters with which these functions were called, network requests from the content tag 114 or the CMP 113 during execution of the webpage, or validations that the functions or network requests were properly defined and executed with appropriate timing and correct data.

In executing the instructions, prior to each web page starting to load, the data collection module 200 installs intercepts and/or listeners into the web browser. Intercepts and listeners are installed using standard web browser extension functionality and through other javascript techniques to achieve the desired interception and logging. Intercepts and listeners are installed into the operator device web browser in order to receive the webpage execution data (including when the stub functions are defined, the function call logs including call stacks, and the network request logs,) and to send that information to the data collection module 200.

The verification module 210 generates verification results that indicate whether the consent tag 114 was installed correctly and the CMP 113 is operating correctly. The verification module 210 evaluates the webpage execution data collected by the data collection module 200 and generates the verification results. In some embodiments, the verification module 210 applies a set of verification rules to the webpage execution data to generate the verification results. A verification rule is a rule that represents an expectation of certain attributes of the webpage execution data should have (or not have) if the consent tag 114 is properly installed by the operator and the CMP 113 is operating correctly. Each verification rule may generate a respective verification result or may be used together with other rules to generate a verification result.

The verification module 210 may evaluate webpage execution data as the webpage files 112 are executed by the web browser 111. For example, the verification module 210 may identify events in the execution of the webpage files 112 that trigger the verification module 210 to apply particular verification rules. The verification module 210 also may evaluate the webpage execution data after the webpage has been displayed to the operator, thereby providing an after-the-fact analysis of the consent tag's installation. The verification module 210 may also evaluate the webpage execution data when the user interface for the consent verification checker is displayed.

In some embodiments, the verification module 210 applies one or more verification rules that evaluate whether the operator has correctly installed the consent tag 114 in the webpage files 112 such that the consent tag 114 executes before other components of the webpage that require the CMP 113 have executed. As noted above, certain components of the webpage may require user consent or acknowledgment before they collect or process the user's data. If the consent tag 114 is installed in the webpage files such that the consent tag 114 is executed after these components, these components may be executed before the CMP 113 has been executed. This may cause the components to incorrectly assume that they lack user consent, or to incorrectly assume that a CMP 113 is not installed on the webpage, in which case the components may reduce their functionality or even fail to operate at all.

For example, a data collection component of the webpage, such as a pixel, may be configured to send user personal data to an advertising campaign manager to enable a targeted advertisement to be provided to the user. If the consent tag 114 is installed incorrectly, the data collection component may be erroneously instructed by CMP 113 to not send user personal data, preventing the provision of a targeted advertisement to the user. In other cases, the data collection component may incorrectly determine that a CMP 113 is not present on the webpage at all, because, for example, the stub functions are not yet defined, or the iframe locator is not correctly defined. Thus, the data collection component may not query the CMP 113 for a consent or acknowledgement status. This may lead to the data collection component improperly collecting personal user data when the user has explicitly declined consent, in violation of data protection regulations. In some cases, execution of the data collection component prior to execution of the CMP 113 might erroneously cause an "opt-out" signal to be sent to the advertising campaign manager, which would prevent the advertising campaign manager from sending targeted advertisements to the user in future cases, even if the user provided the required consent or acknowledgment when the CMP 113 ultimately executed.

To check where the consent tag 114 has been installed in the webpage and whether it is executed early enough, the verification module 210 may apply a verification rule to check function call logs from the webpage execution data to determine when functions corresponding to the consent tag 114 have been executed, and from what component or file of the web page those functions are called from. When the consent tag 114 is executed, certain functions are called and network requests are made as part of preparing the operator device to execute the CMP 113. The verification module 210 may check the function call logs and network request logs generated by the data collection module 200 to determine when these functions were called and network requests made, and therefore when the consent tag was executed. Examination of the network requests by the verification module 210 and timing of other function calls and data returned by the CMP 113 may indicate if the CMP 113 is loaded late or is running slowly on the web page.

To determine whether the consent tag 114 was likely executed after components requiring the CMP 113, the verification module 210 may apply one or more verification rules. For example, the verification module 210 may apply a verification rule that checks whether the first-called function for the consent tag 114 (i.e., the first function that is called to execute the consent tag 114) is called by the main HTML webpage file for the webpage. If the first called function that corresponds to the consent tag 114 was not called by the main HTML webpage file (e.g., it was instead called by a script file that is loaded and executed as part of the webpage), the verification module 210 may determine that the consent tag was executed too late in the execution sequence of the webpage files.

Alternatively, to determine whether the consent tag 114 likely executed after components requiring the CMP 113, the verification module 210 may use the function call logs to determine a line number in the main HTML webpage that is the root function that caused the consent tag to be called. For example, the verification module 210 may examine the function call stack of the first called function corresponding to the consent tag 114 until the verification module 210 identifies a function called from the main HTML webpage. The verification module 210 may use the line number of the function that eventually called the first called function of the consent tag 114 to determine whether that function was part of the HTML webpage header block. If so, the verification module 210 may determine that the consent tag 114 was executed early enough in the execution of the webpage files. If the base function was not part of the header block of the main HTML webpage file, the verification module 210 determines that the consent tag 114 was not executed early enough.

In some embodiments, to determine whether the consent tag 114 has properly set up the operator device for execution of the CMP 113, the verification module 210 applies one or more verification rules to determine whether the consent tag 114 has properly established stub functions to be used by the CMP 113. When the consent tag 114 executes, it may generate stub functions to be used by the CMP 113 to manage a user's consent string. For example, the consent tag 114 may generate stub functions for a "_tcfapi" function or a "_uspapi" function used by the CMP 113. Stub functions are global function and are defined as global properties on the window object (a window object represents an open window in a browser) when the consent tag 114 executes.

Definition of global properties of the "window" object are intercepted and logged by the data collection module 200. The verification module 210 may determine whether the consent tag 114 properly defined the stub functions. The verification module 210 intercepts the definition of the stub functions on the global properties for the "window" object corresponding to the webpage. The verification module 210 also may call the stub functions after the consent tag 114 executes and before the CMP 113 loads and executes to determine whether these stub functions provide the proper stub function call parameters and relay the calls to the CMP 113 correctly. The verification module 210 may call the stub functions to query the configuration of the CMP 113 and to validate that consent status is being returned properly by these functions (and with what timing).

In some embodiments, the verification module 210 applies one or more verification rules to determine whether the consent tag 114 has properly defined a locator iframe. A locator iframe is an iframe at the same level of the web page as the consent tag 114. The locator iframe, when correctly defined, is defined such that the iframe can be identified by other components, that may be executing in other frames or iframes, operating on the webpage as the webpage is displayed to a user. Components running in other frames or iframes generally cannot call the "tcfapi" and "_uspapi" functions directly, and must use a message-passing mechanism (e.g., as defined in the IAB TCF standard). The verification module 210 passes test messages via this mechanism, using the locator iframe to determine the correct iframe to send the test messages to. Thereby, the verification module 210 checks that the consent tag 114 has properly defined a message listener in the correct iframe and relays those messages to the CMP correctly and returns the results as expected. If the message listener is not defined or operating correctly, the verification module 210 will not receive responses to its test messages.

In some embodiments, the verification module 210 identifies the consent configuration settings for the CMP 113 and applies one or more verification rules to determine whether the consent configuration settings have been accurately established. Consent configuration settings are settings set by the webpage operator in the consent management system 140 prior to using the consent verification checker 115. The consent configuration settings establish consent requirements and various options and configurations for the CMP 113 to use. For example, the consent configuration settings may establish how often the CMP 113 checks for user consent, what language the CMP 113 should use in its user interface, how long the CMP 113 will store a user's consent before requiring the user to provide consent again, whether to request consent from all website users or just users within a certain geographical area, or whether the CMP 113 offers an opt-in consent or an opt-out consent for users.

To determine whether the consent configuration settings have been correctly established on the CMP 113, the verification module 210 may receive verified configuration settings from the consent management system 140 and may compare the consent configuration settings established on the CMP 113 to the verified ones from the consent management system 140. The verified configuration settings may be settings that the operator has provided to the consent management system 140 as their intended consent configuration settings for the CMP 113. If the consent configuration settings established on the CMP 113 do not match the verified configuration settings from the consent management system 140, the verification module 210 determines that the consent configuration settings have not been established correctly. If the established consent configuration settings do match the verified configuration settings, the verification module determines that the consent configuration settings have been established correctly.

In some embodiments, the verification module 210 applies one or more verification rules to determine whether the CMP 113 applies the appropriate consent requirements based on the geographic location of the operator device 110. Different jurisdictions may have different requirements for what user consent the webpage must receive before collecting or processing user data. For example, if the webpage is served to a device in Europe, the CMP 113 generally should apply consent requirements that conform with the General Data Protection Regulation (GDPR). Similarly, if the webpage is served to a device in California, the CMP 113 generally should apply consent requirements that conform with the California Privacy Rights Act (CPRA). The verification module 210 determines whether the CMP 113 is applying the appropriate consent requirements based on the detected geographic location of the operator device 110. The verification module 210 may provide, the IP address of the operator device to test whether the CMP 113 correctly identifies that the operator device 110 would be subject to consent management rules for a special jurisdiction. The verification module 210 may provide, as the IP address of the operator device, an IP address for a different geographic location than the one in which the operator device is actually located to test whether the CMP 113 correctly identifies that the operator device 110 would be subject to consent management rules for a special jurisdiction. For example, the verification module 210 may change the IP address of the operator device 110 provided to the CMP 113 such that the operator device 110 appears to be in Europe or California. The verification module 210 then determines whether the CMP 113 applies consent management rules for GDPR or CPRA, respectively. In some embodiments, the verification module 210 tests the CMP 113 by establishing a virtual private network (VPN) to a server located in the desired target geographic location and then requests the webpage through that VPN. In other embodiments, the verification module 210 could use a feature, if provided by the CMP 113, to override the geographic location that was determined from the IP address.

In any case where the verification module 210 finds that the consent tag 114 is not installed or operating correctly, or the CMP 113 is not operating correctly, other website components may execute improperly, which may limit the functionality of the other website components and/or put the website web page operator at risk of violating data privacy laws or regulations.

The results display module 220 displays a user interface to the operator that displays the verification results generated by the verification module 210. This user interface displays which verification rules were applied to the webpage execution data and the verification results for those verification rules. For example, the user interface may display whether the consent tag 114 has been installed early enough in the webpage files such that the consent tag executes before components that require the CMP 113, whether the consent tag 114 properly established stub functions used by the CMP 113, whether the consent tag 114 has properly defined a locator iframe, whether the consent configuration settings for the CMP 113 have been correctly established, or whether the CMP 113 applies the appropriate consent management rules based on the location of the operator device. The user interface may also indicate which version of the consent tag 114 or the CMP 113 the webpage is using and whether that version is the most up-to-date version made available by the consent management system. Additionally, the user interface may indicate when the operator last updated their consent configuration settings, the current values of key configuration settings, and whether the operator should review their consent configuration settings.

In some embodiments, the results display module 220 may write the verification results generated by the verification module 210 to a file which can be accessed or read by the operator later. The results display module may highlight errors or issues found with the consent tag 114 and/or the CMP 113.

In some embodiments, verification checker 115 may execute a script or code which loads multiple webpages on the operator device 110. For example, verification checker 115 may load all of the pages on a website (or "domain"). In some embodiments, the results display module 220 may write the verification results corresponding to the multiple web pages generated by the verification module 210 to a file which can be accessed or read by the operator later. The results display module may highlight errors or issues found with the consent tag 114 and/or the CMP 113.

Advantageously, by using the consent verification checker 115, a website operator can easily diagnose and solve possible issues with the consent tag 114 and CMP 113, confirm that the consent tag 114 is properly installed in their webpage and that the CMP 113 is operating properly, and correct errors and properly install the consent tag in their webpage.

Advantageously, by using the consent verification checker 115, a website operator who is not technically competent in diagnosing and solving possible issues with the consent tag 114 and CMP 113 (for example, is not able to install intercepts and/or listeners into the web browser 111, evaluate function call logs such as call stacks and network request logs, generate stub functions, evaluate stub function call parameters and definitions, pass and evaluate messages to a locator iframe, identify and evaluate consent configuration settings for the CMP 113, and/or provide a different IP address with a different geographic location than the one in which the operator device is actually located) can easily diagnose and solve possible issues with the consent tag 114 and CMP 113, confirm that the consent tag 114 is properly installed in their webpage and that the CMP 113 is operating properly and correct errors and properly install the consent tag in their webpage.

Advantageously, by using the consent verification checker 115, a website operator who is has a consent tag 114 installed on a large number of web pages can easily diagnose and solve possible issues with the consent tag 114 and CMP 113, confirm that the consent tag 114 is properly installed in their webpage and that the CMP 113 is operating properly and correct errors and properly install the consent tag in their webpage.

Advantageously, by using the consent verification checker 115, a website operator can easily diagnose and solve possible issues with the consent tag 114 and CMP 113, decreasing the likelihood that web page operators are violating data privacy laws and regulations, and increasing the likelihood that web page data collection components are fully functional and will be able to use the functions of the CMP 113 *as* intended.

Figure 3:
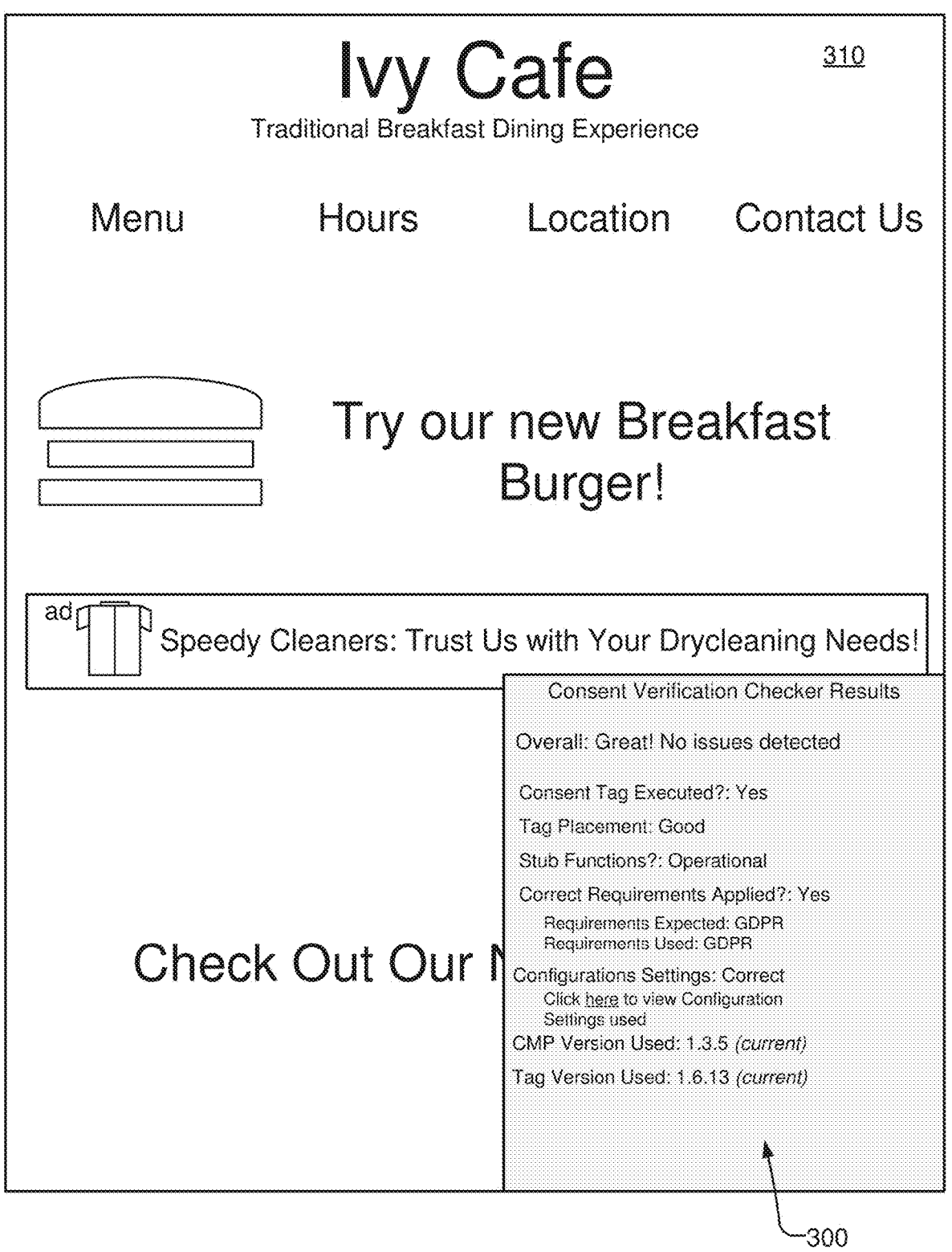
FIG. 3 illustrates an example user interface that displays verification results generated by the consent verification checker, in accordance with some embodiments.

FIG. 3 illustrates an example user interface 300 that displays verification results generated by the consent verification checker 115, in accordance with some embodiments. The example user interface 300 displays verification results generated based on webpage execution data for the displayed webpage 310. In some embodiments, user interface 300 may provide guidance to the webpage operator to correct issues. The user interface 300 and the webpage 310 are displayed on an operator device 110 associated with the operator of the webpage 310. In the embodiment illustrated in FIG. 3, the operator of the webpage 310 is Ivy Cafe, so the user interface 300 and the webpage 310 were displayed on a operator device 110 browsing the Ivy Cafe web page.

FIGS. 4A and 4B illustrate example user interfaces 400 displaying different verification results 410 generated by a consent verification checker 115, in accordance with some embodiments. These example user interfaces 400 may be displayed alongside a webpage, such as the example illustrated in FIG. 3, or may be displayed separately from the webpage.

FIG. 4A illustrates an example user interface 400a displaying verification results 410a that are positive, meaning the consent verification checker 115 did not detect issues in the webpage execution data. The user interface 400a displays verification results that indicate the consent tag 114 executed properly, the consent tag 114 was installed early enough in the webpage files 111, the stub functions were properly established, the correct consent requirements were applied, the expected and used consent requirements were, the consent configuration settings were correct, and the consent tag 114 and the CMP 113 were up-to-date.

FIG. 4B illustrates an example user interface 400b with verification results 410b that are similar to those illustrated in FIG. 4A, however some of the verification results indicate that the consent verification checker 115 detected some issues in the webpage execution data. For example, the verification results 410b indicate that the consent tag 114 was not installed early enough in the webpage files and where the consent tag 114 should have been installed. Additionally, the verification results 410b indicate that the CMP 113 did not apply the correct consent requirements for the location; the CMP 113 should have applied consent requirements under GDPR, but instead applied default consent requirements. Furthermore, the verification results 410b indicate that the consent tag 114 executed by the webpage is out of date, and indicates the version used by the webpage files and the most up-to-date version. In some embodiments, verification results 410b may provide guidance to the webpage operator to correct issues. For example, if 410b indicates that the consent tag 114 placement is not in the main HTML file, verification results 410b may include guidance such as moving the consent tag 114 from its current location into the header block of the main HTML file.

Figure 5:
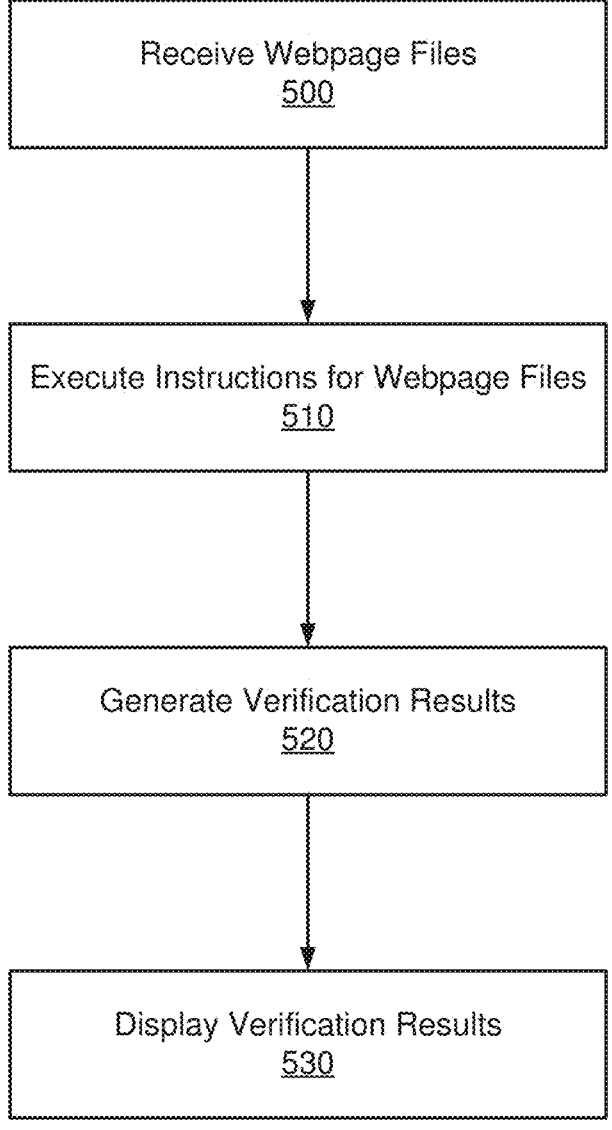
FIG. 5 is a flowchart for a method of verifying a consent management platform ("CMP"), in accordance with some embodiments.

FIG. 5 is a flowchart for a method of verifying a consent tag 114 and a CMP 113, in accordance with some embodiments. Alternative embodiments may include more, fewer, or different steps from those illustrated in FIG. 5, and the steps may be performed in a different order from that illustrated in FIG. 5. Additionally, each of these steps may be performed automatically by a client device without human intervention.

An operator device 110, which has consent verification checker 115 installed, receives 500 a set of webpage files 111 for a webpage. Each webpage file 112 includes computer-readable instructions that can be executed by the web browser 111 of the operator device 110 to display the webpage. The set of webpage files 112 may include a main HTML page for the webpage, which may correspond to a URL for the webpage. Additionally, the set of webpage files 112 may include style or script files that may be used to display or provide additional functionality on the webpage. The set of webpage files include the consent tag 114.

The web browser 111 executes 510 the computer-readable instructions for the set of webpage files 112 to display the webpage to the operator. In executing the instructions, prior to each the web page starting to load, the data collection module 200 may install intercepts and/or listeners into the web browser. The web browser 11 sends webpage execution data to the consent verification checker 115 that describes the execution of the instructions on the web browser 111. For example, the webpage execution data may include function call log data that describes functions called by the computer-readable instructions. In some embodiments, the webpage execution data includes the webpage files 112 as well.

The consent verification checker 115 installed on the operator device 110 generates 520 a set of verification results by applying a set of verification rules to the webpage execution data. The verification rules, when applied to the webpage execution data, determine whether the consent tag 114 was installed correctly based on the execution of the webpage files 112, whether the consent tag 114 executed correctly, and whether the CMP 113 is configured and operating correctly. The verification results indicate whether the consent tag 114 was installed correctly within the set of webpage files 112, whether the consent tag executed correctly, and whether the CMP 113 is configured and operating correctly. For example, the verification results may indicate whether the consent tag 114 was installed too late in the execution of webpage files 112 such that other components of the webpage that rely on the CMP 113 would execute before the consent tag 114 does.

The operator device 110 displays 530 the set of verification results to the operator in a user interface. The verification results may be displayed alongside the webpage or in a separate window from the webpage. In some embodiments, the verification results are displayed by a consent verification checker 115 on the operator device 110.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, executed on a computing device comprising a browser and a consent verification checker, the method comprising:

receiving, by the browser, a set of webpage files for a webpage, wherein webpage files in the set of webpage files comprise computer-readable instructions for displaying the webpage, and wherein the set of webpage files comprise a consent tag that comprises instructions for initializing enforcement of consent requirements for the webpage, wherein initializing enforcement of the consent requirements for the webpage comprises loading a consent management platform ("CMP") for execution by the browser as a component of the set of web page files;

installing, by the consent verification checker, at least one of an intercept and a listener in the browser prior to execution of the computer-readable instructions for displaying the webpage by the browser;

executing, by the browser, the computer-readable instructions for displaying the webpage by the browser;

receiving, from at least one of the installed intercepts or listeners by the consent verification checker, webpage execution data describing the execution by the browser of the computer-readable instructions for the set of webpage files;

applying, by the consent verification checker, a set of verification rules to the webpage execution data, wherein the set of verification rules is not provided by a browser extension;

generating, by the consent verification checker, a set of verification results based on the results of applying the set of verification rules to the webpage execution data, the set of verification results indicating whether the consent tag was installed correctly within the set of webpage files; and displaying the set of verification results to the operator.

2. The method of claim 1, wherein the set of webpage files comprises a main HTML file for the webpage, and wherein the set of verification results indicate whether the consent tag is installed in the main HTML file.

3. The method of claim 2, wherein the set of verification results indicate whether the consent tag is installed in a header block of the main HTML file.

4. The method of claim 2, wherein the webpage execution data comprises function call log data describing functions called by the computer-readable instructions of the set of webpage files, and wherein applying the set of verification rules comprises:

determining whether the consent tag is installed in the main HTML file based on the function call log data.

5. The method of claim 1, wherein the set of verification results indicate whether the consent tag operated within a locator iframe with properties that match a defined set of properties for a locator iframe.

6. The method of claim 1, wherein the webpage execution data comprises an IP address for the computing device, and wherein the set of verification results indicate whether the webpage collected data in compliance with consent requirements corresponding to the IP address for the client device.

7. A non-transitory computer-readable storage medium storing processor-executable computer program instructions that, when executed, cause a computer processor to perform a method, the method comprising:

receiving, by the browser, a set of webpage files for a webpage, wherein webpage files in the set of webpage files comprise computer-readable instructions for displaying the webpage, and wherein the set of webpage files comprise a consent tag that comprises instructions for initializing enforcement of consent requirements for the webpage, wherein initializing enforcement of the consent requirements for the webpage comprises loading a consent management platform ("CMP") for execution by the browser as a component of the set of web page files;

installing, by the consent verification checker, at least one of an intercept and a listener in the browser prior to execution of the computer-readable instructions for displaying the webpage by the browser;

executing, by the browser, the computer-readable instructions for displaying the webpage by the browser;

receiving, from at least one of the installed intercepts or listeners by the consent verification checker, webpage execution data describing the execution by the browser of the computer-readable instructions for the set of webpage files;

applying, by the consent verification checker, a set of verification rules to the webpage execution data, wherein the set of verification rules is not provided by a browser extension;

generating, by the consent verification checker, a set of verification results based on the results of applying the set of verification rules to the webpage execution data, the set of verification results indicating whether the consent tag was installed correctly within the set of webpage files; and displaying the set of verification results to the operator.

8. The medium of claim 7, wherein the set of webpage files comprises a main HTML file for the webpage, and wherein the set of verification results indicate whether the consent tag is installed in the main HTML file.

9. The medium of claim 8, wherein the set of verification results indicate whether the consent tag is installed in a header block of the main HTML file.

10. The medium of claim 8, wherein the webpage execution data comprises function call log data describing functions called by the computer-readable instructions of the set of webpage files, and wherein applying the set of verification rules comprises:

determining whether the consent tag is installed in the main HTML file based on the function call log data.

11. The medium of claim 7, wherein the set of verification results indicate whether the consent tag operated within a locator iframe with properties that match a defined set of properties for a locator iframe.

12. The medium of claim 7, wherein the webpage execution data comprises an IP address for the computing device, and wherein the set of verification results indicate whether the webpage collected data in compliance with consent requirements corresponding to the IP address for the client device.

13. A system comprising:

a processor; and a non-transitory computer-readable storage medium storing processor-executable computer program instructions that, when executed, cause a computer processor to perform a method, the method comprising:

receiving, by the browser, a set of webpage files for a webpage, wherein webpage files in the set of webpage files comprise computer-readable instructions for displaying the webpage, and wherein the set of webpage files comprise a consent tag that comprises instructions for initializing enforcement of consent requirements for the webpage, wherein initializing enforcement of the consent requirements for the webpage comprises loading a consent management platform ("CMP") for execution by the browser as a component of the set of web page files;

installing, by the consent verification checker, at least one of an intercept and a listener in the browser prior to execution of the computer-readable instructions for displaying the webpage by the browser;

executing, by the browser, the computer-readable instructions for displaying the webpage by the browser;

receiving, from at least one of the installed intercepts or listeners by the consent verification checker, webpage execution data describing the execution by the browser of the computer-readable instructions for the set of webpage files;

applying, by the consent verification checker, a set of verification rules to the webpage execution data, wherein the set of verification rules is not provided by a browser extension;

generating, by the consent verification checker, a set of verification results based on the results of applying the set of verification rules to the webpage execution data, the set of verification results indicating whether the consent tag was installed correctly within the set of webpage files; and displaying the set of verification results to the operator.

14. The system of claim 13, wherein the set of webpage files comprises a main HTML file for the webpage, and wherein the set of verification results indicate whether the consent tag is installed in the main HTML file.

15. The system of claim 14, wherein the set of verification results indicate whether the consent tag is installed in a header block of the main HTML file.

16. The system of claim 14, wherein the webpage execution data comprises function call log data describing functions called by the computer-readable instructions of the set of webpage files, and wherein applying the set of verification rules comprises:

determining whether the consent tag is installed in the main HTML file based on the function call log data.

17. The system of claim 13, wherein the set of verification results indicate whether the consent tag operated within a locator iframe with properties that match a defined set of properties for a locator iframe.

18. The system of claim 13, wherein the webpage execution data comprises an IP address for the computing device, and wherein the set of verification results indicate whether the webpage collected data in compliance with consent requirements corresponding to the IP address for the client device.

* * * * *